United States Patent [19]
Spurgeon

[11] Patent Number: 5,385,214
[45] Date of Patent: Jan. 31, 1995

[54] HEAT STORAGE SYSTEM UTILIZED IN HEAT ENGINE DRIVE SYSTEM

[76] Inventor: John E. Spurgeon, 204 Judith Ct., Novato, Calif. 94949-5473

[21] Appl. No.: 982,777

[22] Filed: Nov. 30, 1992

[51] Int. Cl.⁶ .............................................. B60K 3/04
[52] U.S. Cl. ................... 180/304; 180/310; 60/659; 165/902
[58] Field of Search ............. 180/303, 304, 310, 36; 60/659; 165/10, 902

[56] References Cited

U.S. PATENT DOCUMENTS

| | | | |
|---|---|---|---|
| 578,031 | 3/1897 | Skvara | 180/304 X |
| 1,360,506 | 11/1920 | Doble | 180/304 X |
| 1,751,734 | 3/1930 | Harris | 180/304 X |
| 3,778,578 | 12/1973 | Long et al. | 180/310 X |
| 3,830,326 | 8/1974 | Hartung | 180/303 X |
| 4,020,637 | 5/1977 | Izumi . | |
| 4,050,536 | 9/1977 | Pristash | 180/303 |
| 4,079,591 | 3/1978 | Derby et al. | 60/659 X |
| 4,094,377 | 6/1978 | Biggs | 180/304 X |
| 4,226,294 | 10/1980 | Latter et al. | 180/304 X |
| 4,326,598 | 4/1982 | Acker | 180/304 |
| 4,479,355 | 10/1984 | Guide et al. | 60/659 X |
| 4,483,761 | 11/1984 | Paspek, Jr. . | |
| 4,509,464 | 4/1985 | Hansen . | |
| 4,698,974 | 10/1987 | Wood . | |
| 4,783,963 | 11/1988 | Thomas . | |
| 4,895,136 | 1/1990 | Poppe . | |
| 5,038,580 | 8/1991 | Hart . | |
| 5,048,466 | 9/1991 | Rudd, deceased . | |
| 5,083,605 | 1/1992 | Collings . | |
| 5,207,268 | 5/1993 | Krause et al. | 60/659 X |

FOREIGN PATENT DOCUMENTS 2542370  3/1977  Germany ............................. 60/659

OTHER PUBLICATIONS

Special Report, "Supercritical Water: A Medium for Chemistry" by Shaw, et al., *Chemical & Engineering News*, Dec. 23, 1991, pp. 26–39.

*Primary Examiner*—Brian L. Johnson
*Attorney, Agent, or Firm*—Richard G. Kinney

[57] ABSTRACT

A 'heat battery' or heat storage device based on the phenomena that at a particular temperature and pressure water becomes supercritical and can absorb increasing quantities of heat without a corresponding increase in either temperature or pressure. The device may operate a heat engine such as the Stirling engine or a steam turbine engine in an automobile. The battery includes a pressure vessel for maintaining a charge of water in the vessel at approximately 374 degrees Centigrade and 221 bars of pressure. A heat exchanger coil is positioned in the vessel from which useful heat is extracted and applied to end use such as a heat engine. An electric heater for inputting heat into the charge of water is positioned in the vessel and external connections from the vessel allow for changing the charge of supercritical water and for substituting high supercritical heat containing water for a charge that has been substantially depleted of supercritical heat.

14 Claims, 3 Drawing Sheets

HEAT STORAGE SYSTEM UTILIZED IN HEAT ENGINE DRIVE SYSTEM

SPECIFICATION

1. Field of the Invention

The present invention relates to energy storage and is especially concerned with an engine and stored energy device for use in vehicles.

2. Background of the Invention

The internal combustion used in vehicles and burning petroleum fuels carried on the vehicle creates as a by-product of their normal operation significant quantities of air pollution. Numerous steps to lessen the pollution output of such engines have been taken and proposed, but these have not yet achieved sufficient progress. Use of alternative types of power—electric and steam engines has been seriously proposed to meet this problem. Electric powered vehicles suffer from the inability to easily and cheaply store sufficient electrical energy to allow the vehicle to have a range between recharging approaching that of existing vehicles which use diesel or gasoline engines. The common lead storage battery is too heavy and can store too small an amount of energy to be practical except under a limited range of conditions, such as, for example, in a fleet of lightweight delivery or service vehicles used in a densely populated area where pollution is so high that extreme steps must be taken to reduce it.

Although external combustion engines such as the Stirling cycle steam engine have much to recommend them, most require the burning of a fuel such as kerosene in a boiler to generate steam. The combustion occurs in the vehicle and produces by-products of combustion which also contribute to pollution. Although the quantity of such pollution is inherently not as much as the internal combustion gasoline and diesel engines, these combustion by-products detract from the desirability of using a steam engine as a substitute for the internal combustion engines now commonly in use.

There thus exists a need for a power plant and stored energy combination which overcomes the drawbacks of the existing commercial combinations and which has sufficient stored energy to have a long range between recharging, is relatively low weight, and produces little or no combustion by-products while operating.

SUMMARY OF THE INVENTION

To overcome one or more of the aforesaid drawbacks, the present invention provides the combination of a heat engine powered by heat stored in a heat battery or storage device. The heat battery is a vessel holding a predetermined charge or quantity of water at or very near the following temperature and pressure: 374 degrees C. and 221 bar, and which has a large quantity of stored heat, and, in accordance with the present invention, means (such as a heat exchange coil in the water) for extracting heat from the water are provided.

At this temperature and pressure, the water can absorb and store a great quantity of heat and has a greatly increased heat capacity than water at significantly differing temperatures and pressures.

By maintaining this temperature and pressure at or very near this critical point, heat energy can be absorbed by a charge of water without a rise in temperature or pressure, and heat can be removed without a fall in temperature (until the quantity of stored heat beyond that needed to keep the water at 374 degrees C. is exhausted. For convenience, we will here term this stored heat above that level as "supercritical heat.") An electric heating coil can be used to keep a full charge during extended non-use and also be used to recharge the heat battery by adding "supercritical heat" to the battery.

The invention includes the concept of combining this heat battery and heat engine into a vehicle. Since the heat energy is imminently available and, as such, a heat engine can begin operation quickly and charge its operational conditions (i.e. speed up) quickly, this makes the vehicle quick and responsive and overcomes one of the drawbacks of early steam engine powered vehicles.

When used in an automobile, the battery may be recharged by replacing its water charge which has substantially depleted its "supercritical heat" with water which is already highly superheated. This may be done at a "filling" station and thus avoid the need to have the vehicle stationary while "recharging" the heat battery. That is, as a practical matter, "filling" stations having supercritical water with a high level of supercritical heat which can be used to recharge the battery by means of hydraulic couplings, to remove the discharged or low supercritical heat water and introduction of high supercritical heat water.

The invention, together with further advantages and features thereof, may best be understood by reference to the following description taken in connection with the accompanying drawings, in the several figures of which, like reference numerals identify like elements.

DETAILED DESCRIPTION OF A PREFERRED EMBODIMENT

Figure 1:
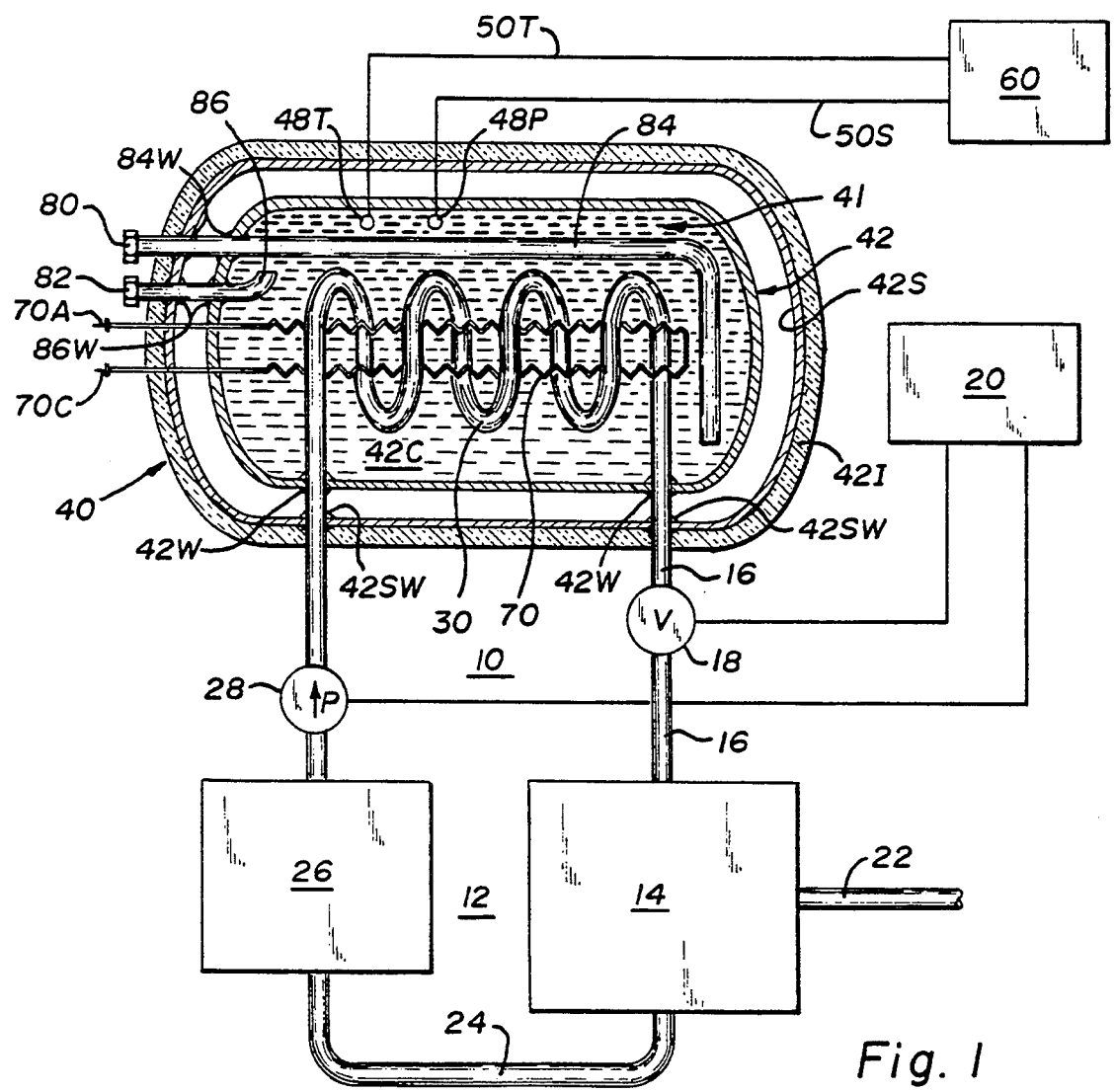
FIG. 1 is a perspective and schematic view with parts cut away to show interior construction of a heat battery apparatus constructed in accordance with the principles of the present invention.

Referring to FIG. 1, there is depicted a heat battery-engine apparatus generally identified by the number 10 which includes a heat engine section 12 and a heat storage device or battery section 40.

The heat engine 12 may be entirely conventional in operation and thus need not be described in detail. The engine 12 includes a steam turbine 14 which receives high pressure steam from a line 16 controlled by a valve 18 by suitable engine controls 20. The mechanical output of the steam turbine is taken from rotation drive shaft 22 and spent steam exits through line 24 from which it goes to a condenser 26. Liquid from the condenser 26 is pumped by pump 28 into a heat exchange coil 30 inside the heat battery 40. The output of this coil is controlled by the valve 18 and selectively delivered to the line 16.

Thus, steam generated from the heat battery 40 is applied to a turbine 14 which turns drive shaft 22. The spent steam is fed via line 24 to a condenser where it is cooled and returns to the liquid state. Liquid from condenser 26 is pumped to the heat exchanger where it takes on heat and is raised in temperature and when leaving the heat exchanger is flashed into steam to run the turbine 14.

The heat battery or heat device 40 includes a high pressure vessel 42 capable of easily containing pressures of at least 221 bar, preferably with a large safety margin. The vessel 42 is preferably surrounded by means such as a vacuum chamber to contain heat transfer. As depicted, the vessel 42 has an outer vacuum defining shell 42S and also has a thick, high efficiency, hard foam insulating layer 42I outside of it. Suitable means (not shown) for mounting the vessel 42 spaced within the chamber of wall 42S are provided. The chamber 42C defined by the vessel 42 is filled with purified water at a critical pressure and temperature and which exhibits the property shown in FIG. 2 and discussed below. The heat exchange tubing 30 enters and exits the chamber 42C through the wall of the vessel 42 in a leak-proof manner such as by being welded to the wall 42 about the exterior of the tubes as indicated at 42W and 42SW. As is normal for a heat exchanger, the tubing 30 has no opening from its interior into the chamber 42C and serves to transfer heat from the water in the chamber to the fluid in the tubing 30.

A pair of probes 48T and 48P for sensing temperature and pressure is provided in the chamber 42C. The probes produce signals over output cables 50T and 50S which are connected to a display unit 60 for displaying the temperature and pressure within the chamber 42C. The difference between the actual pressure and temperature and the critical pressure and temperature can be used to determine the position on the chart of FIG. 2 and the quantity of supercritical heat remaining in the battery 40 and thus serves to indicate the level of heat charge remaining to be used. Thus the probes and the display 60 can function analogously to the fuel gauge for a fuel tank.

A suitable means for inputting heat is provided in the form of an electrical heating element 70 whose electrical connections 70A and 70C may be selectively connected to a suitable electrical power input (e.g. conventional 120 Volt AC power) for inputting heat energy into the battery 40. When used in a vehicle, this inputting of heat energy may occur overnight when the vehicle is parked in a garage or trickle heat charged during a long period of non-operation. Of course, it is possible to use the heat exchanger coil 30 to input heat energy into the battery 40 by supplying fluid with the coil at a temperature higher than that of the water in chamber 42C, but for many applications it will be most convenient to apply the energy in the form of an electrical heater such as heater 70.

The heat battery 40 may alternatively be charged by replacing the water in its chamber with water at the same critical temperature and pressure but which contains a large quantity of stored supercritical heat. This may be done through the valve connections 80 and 82 which respectively control passage of water through tubes 84 and 86 and which have one end connected to the valves 80 and 82 and the other end being open and within the chamber 42C at opposite ends thereof. The tubes 84 and 86 pass through the walls 42S and 42 and are sealed by welding or the like at 84W and 86W. By connecting water at the critical pressure and temperature but with large stored supercritical heat to the valves 80 and 82, opening those valves and pumping water in and out of the respective tubes at the same time, the water charge in vessel 42 may be substantially or completely changed in a short time. This in effect replaces low stored heat water with high stored heat water and effectively "recharges" the battery 40.

Figure 2:
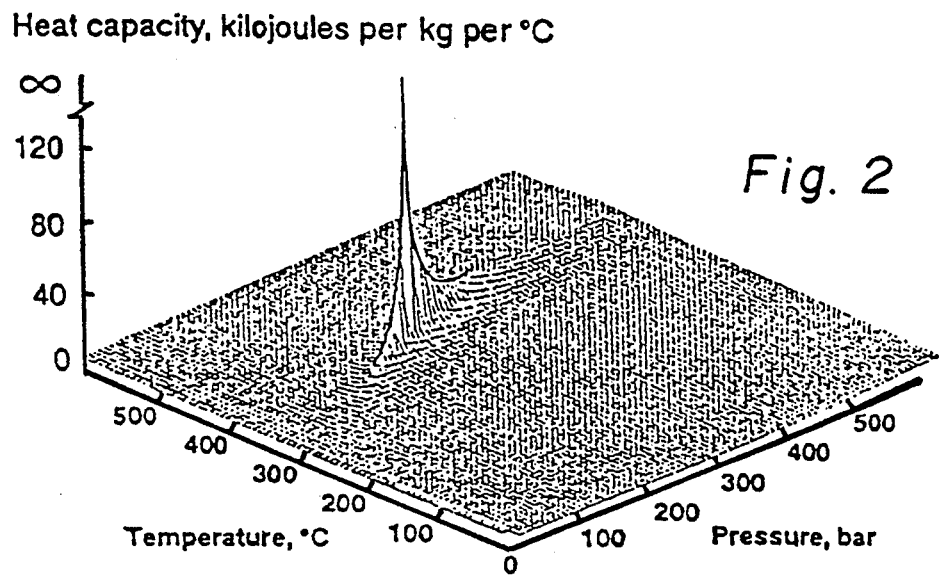
FIG. 2 is a graph illustrating the heat capacity of water at a range of temperatures and pressures including the critical point and near approaches to that point.

Referring to FIG. 2, there is depicted a graph of the heat capacity of water as a function of temperature and pressure. The heat capacity is shown in kilo joules per kilogram, per degree Centigrade, temperature in degrees Centigrade, and pressure in bars. The surface there depicted shows that water, when at the critical point of 374 degrees Centigrade and 221 bar, the heat capacity appears to approach infinity. Even at 25 degrees above the critical point and 300 bar, the heat capacity is still at least an order of magnitude higher than its asymptotic value of 4 kilojoules per kg per degree Centigrade at very high and very low pressures.

A discussion of this singularity is found in the Dec. 23, 1991 issue of Chemical And Engineer News Vol. 69, Number 51 starting at page 26 and entitled SUPERCRITICAL WATER A MEDIUM FOR CHEMISTRY, written by Robert W. Shaw, et al. This article shows a small sized supercritical water containing reaction cell.

Figure 3:
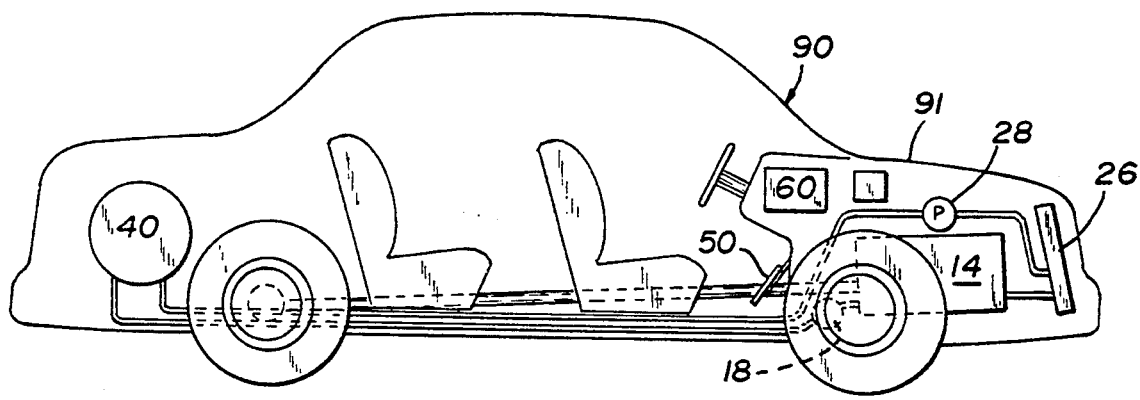
FIG. 3 is a schematic view of a vehicle, a passenger automobile, incorporating the heat battery device and a heat engine.

In FIG. 3, a vehicle 90 is depicted employing the heat battery engine apparatus of FIG. 1 as its prime mover. In this particular example, the vehicle is a passenger automobile having a hood 91; however, the invention could be applied to many other types of vehicles such as a motorcycle, bus or truck. In the vehicle 90, the condenser 26 is mounted-as would be a radiator in a conventional gasoline or diesel vehicle under the hood 91, the turbine 14 replaces the gasoline or diesel engine, and the heat battery 40 replaces the conventional fuel tank. With this arrangement, the accelerator 50 controls the valve 18 and thus the transfer of steam to the turbine, and much of the drive and handling characteristics of a conventional gasoline or diesel automobile may be preserved.

The vehicle 90 can be recharged with supercritical water having a large quantity of supercritical heat at a properly equipped filling station in a few minutes, much in the same way as conventional vehicles are refueled.

Figure 4:
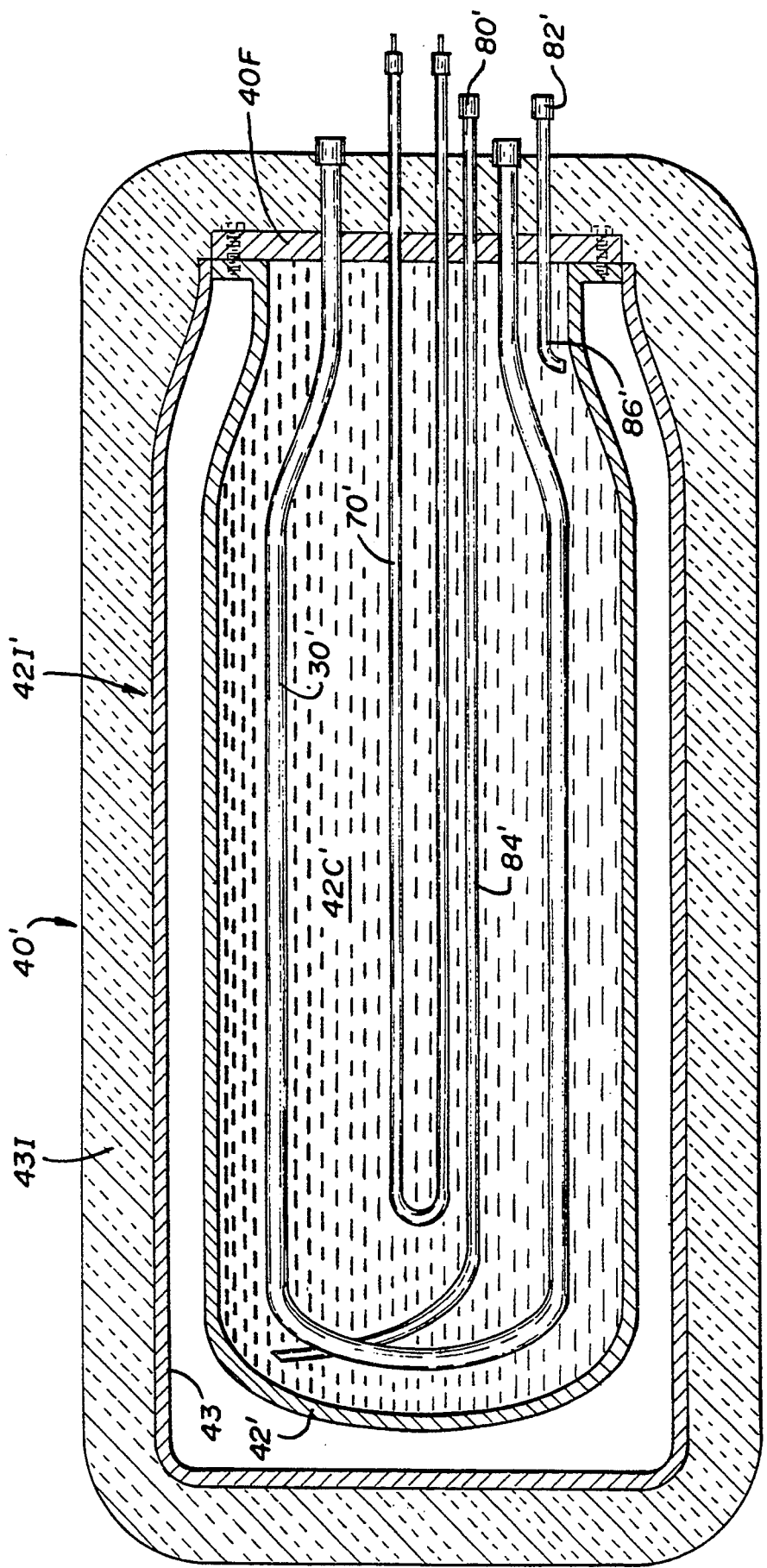
FIG. 4 is a sectional view of a second embodiment of a heat battery constructed in accordance with the present invention.

Referring to FIG. 4, there is depicted a heat battery unit 40' of an alternative and preferred embodiment. The unit 40' includes a pressure vessel 42' of stainless 348 steel with an approximately four-inch wide diameter and approximately four feet in length (depicted shortened for ease of illustration), with a neck diameter of approximately three inches. A flange 40F at the opening serves to seal the chamber 42C'. All internal chamber components are mounted through the neck and flange 40F and the heat exchanger 30' is preferably in the form of a bundle of half-inch tubes of the same stainless steel formed into a generally U-shape with both ends passing out of the flange 40F. For ease of illustration, only one tube 30' is shown in FIG. 4, it being understood that several tubes are similarly arranged, the inputs of all these tubes are connected to the supply line and the outputs to the valve 18 of FIG. 1. A heat input in the form of electrical heater 70' is provided. The insulating means 42I' includes a vacuum containing "bottle" 43 of thin walled stainless steel as well as insulating material 43I. Water exchange inlet valves 80', 82' and tubes 84', 86' are provided for charging the battery by Water exchange.

Figure 5:
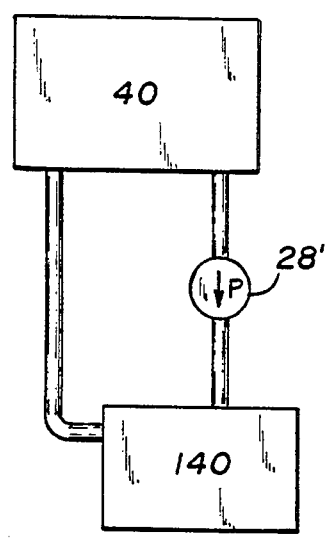
FIG. 5 is a schematic view of an alternative arrangement of the heat battery with a Stirling engine.

FIG. 5 shows the heat battery 40 used with a Stirling engine 140, to which heat is delivered by a pump 28' and from which mechanical energy is obtained.

While particular embodiments of the invention has been shown and described, it will be obvious to those skilled in the art that changes and modifications may be made without departing from the invention and, therefore, the aim in the appended claims is to cover all such changes and modifications as fall within the true spirit and scope of the invention.

For example, the above described heat engine may be any heat engine using any suitable liquid, and while described in an automobile, the present engine-heat storage battery apparatus may be adaptable to aircraft and other vehicles and could even be used effectively in certain stationary applications. Also, while the fluid used to store heat is supercritical water, any other fluid which exhibits this property might be employed, although, at the present time, only water is known to the inventor to possess this supercritical heat phenomenon.

I claim:

1. The combination of a heat engine operatively connected to a heat battery device so as to be run off of heat extracted from said heat battery device, which heat battery device comprises:
    a vessel for holding a predetermined quantity of water, said vessel constituting means for and being constructed for maintaining water contained therein at 221 bar pressure and 374 degrees Centigrade;
    means coupled to said vessel and said heat engine for extracting heat from water in said vessel and for transfer of such extracted heat to said heat engine; and
    a predetermined quantity of water in said vessel, which water is at approximately the following temperature and pressure:
    374 degrees Centigrade
    221 bar
    and which water contains a quantity of stored supercritical heat.

2. The invention of claim 1 wherein said heat engine and said heat battery device are mounted in a movable vehicle and said engine serves as the prime motive power source of said vehicle.

3. The invention of claim 2 wherein the vehicle is an automobile and the heat engine is a steam engine.

4. The invention of claim 2 when the heat engine is a Stirling engine.

5. The invention of claim 3 wherein the vehicle has a front and a hood and the steam engine includes a turbine, condenser, and heat exchanger which are operationally interconnected together in said vehicle and said turbine is mounted under said hood, and said condenser is mounted at said front of the vehicle.

6. A combination of a heat using device, a heat storage device operationally connected thereto, which heat storage device comprises:
    a vessel holding a quantity of water such that when said quantity of water is heated to approximately 374 degrees C., the pressure in the vessel is approximately 221 bar; and
    means for extracting heat from said quantity of water for transfer to said heat using device and means for injecting heat into said water.

7. A heat battery comprising:
    a vessel for holding a predetermined charge of water at the conditions of approximately 374 degrees Centigrade and approximately 221 bar pressure and means for maintaining the predetermined charge of water in said vessel at said conditions of pressure and temperature;
    a predetermined charge of water in said vessel at said conditions and having stored supercritical heat energy; and
    means coupled to said vessel for extracting heat energy from water in said vessel.

8. The vessel of claim 7 in which means for inputting heat energy into said charge of water in said vessel is provided.

9. The battery of claim 7 wherein means are provided for replacing the charge of water in said vessel with a fresh charge, so that heat energy can be recharged into said battery by replacing a first charge of relatively low stored heat energy with a replacement containing high stored heat energy.

10. The battery of claim 9 in combination with and forming part of an automobile having a heat engine as said automobile's prime mover and wherein said battery is coupled to and serves as the source of heat for said engine.

11. The battery of claim 8 in combination with and forming part of an automobile having a heat engine as said automobile's prime mover and wherein said battery is coupled to and serves as the source of heat for said engine.

12. A heat battery comprising:
    a vessel for holding a charge of a material which exhibits supercritical behavior such that said material may absorb a large quantity of supercritical heat when at or near a critical pressure and temperature, said vessel including means for maintaining that pressure and temperature;
    means associated with said vessel for removal of heat from a charge therein; and
    a charge of such material in said vessel and at said critical pressure and temperature, which material has a large quantity of supercritical heat.

13. The battery of claim 12 in combination with an automobile having a heat engine as a prime mover wherein said battery is coupled to and serves as the source of heat for said engine.

14. The vessel of claim 12 in which means for inputting heat energy into said charge of such material in said vessel is provided.

* * * * *